United States Patent

[11] 3,543,743

[72] Inventor John Walter Foderick
 115 Ramsey St., Hastings, Minnesota 55033
[21] Appl. No. 645,121
[22] Filed June 12, 1967
[45] Patented Dec. 1, 1970

[54] COMBINED URINARY CATHETER AND SPECIFIC GRAVITY MEASURING APPLIANCE
 1 Claim, 4 Drawing Figs.

[52] U.S. Cl. ..................................... 128/2,
 73/445, 128/275, 128/295
[51] Int. Cl. ..................................... A61b 10/00
[50] Field of Search ......................... 128/2, 349,
 350, 275, 294, 295; 73/440—445

[56] References Cited
 UNITED STATES PATENTS

| | | | |
|---|---|---|---|
| Re 2,657 | 6/1867 | Allen | 73/444 |
| 1,414,032 | 4/1922 | McCrary et al. | 73/444 |
| 1,688,811 | 10/1928 | Henny et al. | 73/445 |
| 3,175,553 | 3/1965 | Mattson | 128/2 |
| 3,345,980 | 10/1967 | Coanda | 128/2 |
| 3,362,400 | 1/1968 | De Bella | 128/2 |
| 3,460,395 | 8/1969 | Shaw | 73/440 |

FOREIGN PATENTS

| | | | |
|---|---|---|---|
| 388,179 | 1/1924 | Germany | 73/444 |
| 73,596 | 6/1916 | Switzerland | 73/444 |

Primary Examiner—Richard A. Gaudet
Assistant Examiner—Kyle L. Howell
Attorney—J. Harold Kilcoyne ABSTRACT: A combination urinary catheter and specific gravity measuring device for bedside use comprising the combination of an indwelling retention catheter including a drainage tube, a urine drain line extending between the proximal end of said drainage tube and a collection receptacle, tube means incorporated in and being a length section of said drain line and forming a urine test chamber, means for maintaining a constant-level column of urine in said test chamber, and an hydrometer disposed in said test chamber and floating on that portion of the column of urine freshly draining thereinto.

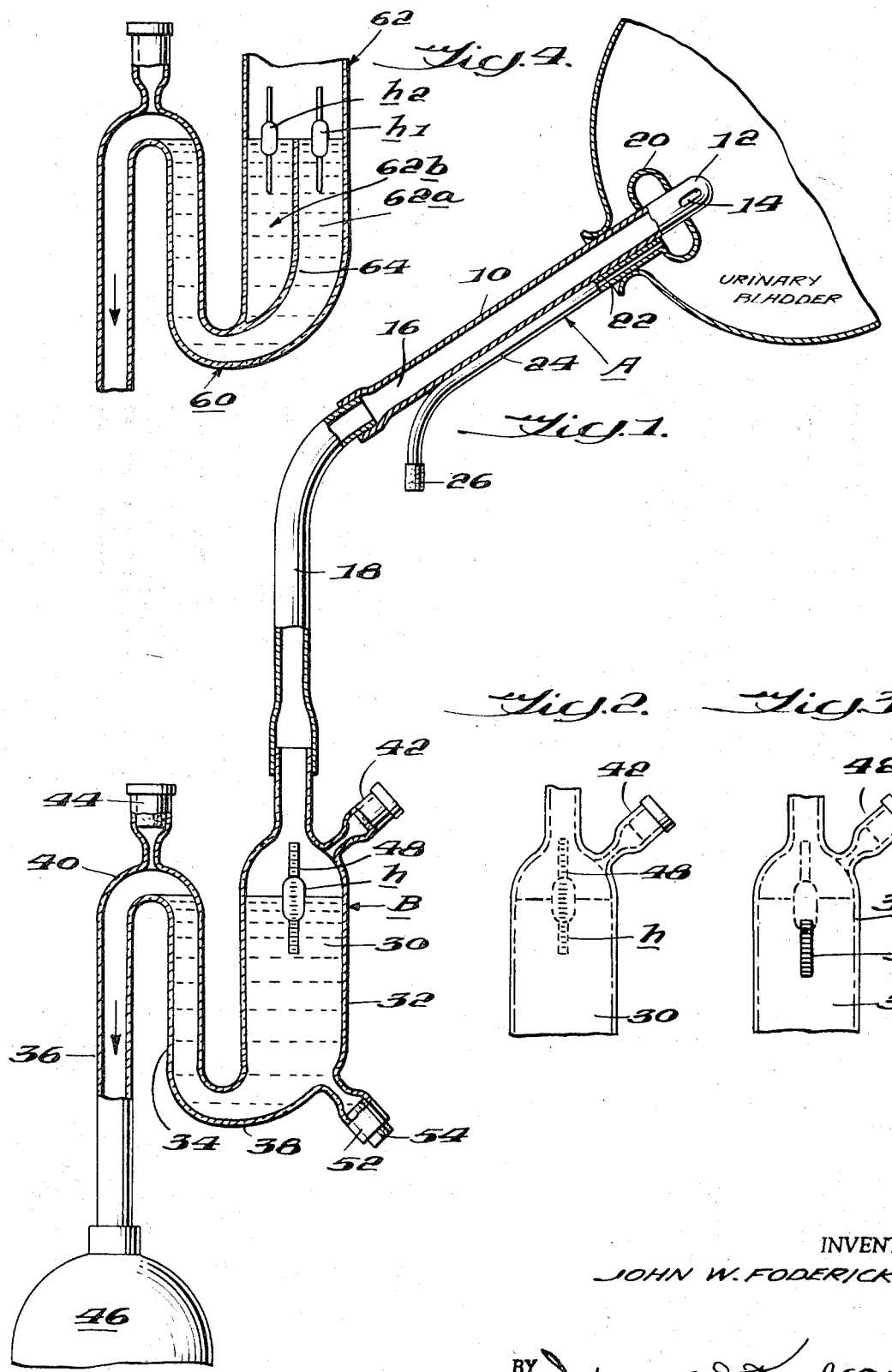

COMBINED URINARY CATHETER AND SPECIFIC GRAVITY MEASURING APPLIANCE

This invention relates to improvements in a combined urinary catheter and specific gravity measuring appliance useful in relating specific gravity readings of urine to functions of body organs and chemical structure of body fluids.

By way of preamble, it is explained that with other factors such as kidney function being constant, urine volume production is directly related to plasma fluid and electrolyte concentration regulation of a patient receiving intravenous fluid therapy for conditions such as extensive burns, shock, etc., and indirectly it also gives an indication of the state of total body hydration. Hence, urine volume output determinations have been commonly utilized clinically during the course of fluid and electrolyte administration.

However, probably because no simple and practical means of urine collection and specific gravity determination for bedside use has been available, studies on urinary solutes are seldom considered routinely, although it is well known that urinary specific gravity gives an aggregate measurement of the "tonicity" of urine solutes. Thus, in body dehydration, the urine is concentrated with a high specific gravity and small volume, depending on the ability of the kidney to concentrate. In unusual circumstances, the solute load is high in spite of dehydration. In cases of salt depletion, the urine becomes scant and sodium and chloride are absent.

But to be of value, urinary specific gravity determinations should be conducted at regular intervals during the course of fluid and electrolyte administration as would enable charting similar to temperature charting, thus giving a profile study of value in fluid and electrolyte regulation. More importantly, to insure that the charting will accurately represent the solute load of kidney urine at the time of charting, the determinations of the specific gravity must be made on urine draining directly from the bladder rather than on pooled, usually stagnant specimens thereof collected prior to the time of charting.

With the above considerations in mind, it is a primary object of the invention to provide a simple, practical and highly effective means of measuring and indicating the specific gravity of urine substantially as it is being produced by a patient.

Another major object of the invention is the provision of a simple diagnostic appliance, suitable for bedside use, for determining the specific gravity of urine draining from the bladder of a patient, which is so constituted as enables the periodic charting of the solute load of the urine to be made, as in turn gives a profile study useful in intravenous fluid and electrolyte regulation.

A further object of the invention is the provision of an appliance as aforesaid incorporating a testing chamber so constructed and arranged as to make continuously available for specific gravity determinations the most recently produced urine.

A more particular object of the invention is the provision of a diagnostic appliance in the nature of a combined indwelling urinary catheter and a specific gravity measuring device of the "continuous test-fluid supply type", and wherein said components are combined as to enable specific gravity determinations to be conveniently and routinely performed on urine leaving the patient by the regular nursing staff without additional laboratory expense to the patient, as is usually incurred in determining the specific gravity of pooled urine specimens.

The above and other objects and features of advantage of a diagnostic appliance according to the present invention will appear from the following description and accompanying illustrative drawing thereof, wherein:

FIG. 1 is a part-sectional side elevation of said appliance assumed to be set up for bedside use in determining the specific gravity of urine leaving the patient;

FIGS. 2 and 3 are detail views illustrating alternate provisions for indicating the specific gravity of the urine passing through the appliance; and FIG. 4 is a broken-away detail view illustrating a modified arrangement of test chamber which enables comparison of the specific gravities of side-by-side specimens of urine being produced by a patient, one of which is a quiescent specimen and the other is a continuously flowing fluid stream thereof.

Referring to the drawing in greater detail, a diagnostic appliance as herein contemplated and provided comprises a combined in dwelling or retention-type urethral catheter generally designated A and an hydrometer-type specific gravity measuring and indicating device designated B, which latter is so constructed per se and so connected to the catheter that urine draining from the bladder of the patient through the drain tube of the catheter is directed to and thence caused to flow through the testing chamber of said device in which the hydrometer floats as a free-flowing stream. By such an arrangement, it becomes possible to obtain periodic determinations of specific gravity of fresh specimens of a patient's urine substantially as it is produced, rather than of pooled, usually stagnant specimens thereof.

More particularly, while the aforesaid catheter A may take one of the more sophisticated forms thereof disclosed and claimed in my U.S. Pat. Nos. 3,211,150 and No. 3,211,151, dated Oct. 12, 1965, for purpose of simple disclosure it is shown as a so-called Foley catheter comprising an elongated soft rubber tube 10 of external diameter appropriate for its intended purpose, the distal or tip end 12 of which is closed and provided with one or more drainage openings 14 leading to its interior lumen or passage 16, and the proximal end of which is open and connected to a drainage tube 18. As is conventional, said tube 10 is provided adjacent its tip end with retention means as enables said end to be secured in place within a body cavity, i.e. the bladder, such comprising a distensible and collapsible rubber or like material annulus 20 which is disposed in edge-secured, encircling relation about the catheter tube proper a short distance rearwardly (proximally) of its drain openings 14. When distended as it is shown in FIG. 1, the annulus 20 takes the form of an annular retaining collar which secures the catheter in place in said body cavity, with distension being effected by a suitable fluid medium which is forced under positive pressure into the interior of said annulus through a fluid passage 22 separate from the main catheter passage 16 and which is preferably formed in an auxiliary tube 24 which extends along the catheter tube 10 from the annulus to a point short of the proximal end of the catheter tube, whereat it branches away from the latter. As illustrated, the free branched end of said auxiliary tube 24 is normally closed by a self-sealing plug 26 through which the pressure fluid required to distend the annulus 20 to its retaining collar formation is introduced as by a separate syringe, although it will be understood that if the catheter takes the form of that shown in my U.S. Pat. No. 3,211,151, said branched terminal end will instead carry a hand pump fixedly associated therewith for distending the retention collar.

As clearly shown in FIG. 1, the proximal end of the catheter is connected directly via the drainage tube 18 to the testing chamber 30 of the aforesaid urinary specific gravity measuring and indicating device B in which the hydrometer designated $h$ floats and which is provided by the first and preferably enlarged-diameter leg 32 of a three-legged tube structure which is preferably formed by bending a straight tube formed of clear plastic to generally S or serpentine formation as to provide three vertically disposed legs designated 32, 34 and 36 connected by intermediate U-bends 38, 40. By forming the second or middle vertical leg 34 with lesser height than said first leg 32, it will be seen not only that a pool of urine is always available in the testing chamber 30 provided by said first leg for specific gravity measuring purposes, this by virtue of the fact that a fixed volume of urine will be trapped in said chamber, but also, because urine entering said chamber in excess amount can flow freely therethrough, that the hydrometer $h$ will always float in the most recently produced urine entering same.

To provide for free entry of atmospheric air to the interior passages of the tube structure as aforesaid as prevents the occurence of airlock forming therein, air inlet means are provided at the upper end of said first or entering leg 32 at a point disposed well above the normal liquid level therein and also in the upper wall of the U-bend 40 which connects the second and third vertical legs 34, 36 of said structure. While such means may be in the nature of one-way check valves arranged to admit air to the tube structure passages while preventing any possibility of urine flowing outwardly therethrough, they preferably are formed by simple plugs of micropore material inserted into small cup-shaped plug containers 42, 44 formed or otherwise provided on the tube structure generally as shown.

It will be appreciated that such arrangement provides for constancy of liquid level within the testing chamber 30 defined by the first leg 32 of the tube structure, and that it further insures free flow of the urine from said chamber over the dam or weir provided by the lower wall of the aforesaid U-bend 40 from whence it flows down the third leg 36 to a collection receptacle 46, partially shown in FIG. 1.

Illustratively, the hydrometer $h$ is shown to have the general configuration of a fishing bob and, like such a bob, it comprises a buoyant body affixed intermediate the ends of a stem weighted at its lower end so that it will assume a vertical position when floating in the pool or urine contained in the testing chamber 30. Direct readings of specific gravity may be obtained by inscribing the upper portion of the stem and buoyant body of the hydrometer which extends above liquid level with a suitable scale 48 graduated in terms of specific gravity, as in FIG. 2. Alternatively, indirect readings of specific gravity may be obtained by providing or inscribing a suitably calibrated scale 50 on the outer surface of the inlet leg 32 of the tube structure, such using as a point of reference a visually identifiable mark on the buoyant body of the hydrometer which normally lies below the urine level therein, such as a colored line.

FIG. 1 illustrates yet a further feature of the urinary specific gravity measuring device B according to the invention, namely, its potential for the collection of sterile specimens of urine for laboratory testing, as may be required. Such potential is realized by providing the tube structure, preferably at a point near the lower end of the first vertical leg 32 thereof, with a normally closed bleed-off outlet generally designated 52. This outlet is normally capped by a rubber stopper 54 through which a sterile needle may be introduced for syringe withdrawal of urine from the main body thereof contained in a passing through the testing chamber 30 provided by the leg 32 of the tube structure. It will be appreciated that such withdrawal in nowise affects the capability of the device B in also providing urinary specific gravity determinations in the manner described above.

According to the modified form of tube structure 60 shown in FIG. 4, plural urinary specific gravity determinations, one of free-flowing and the other of pooled urine, are obtainable. More particularly, the inlet leg 62 of said modified three-legged tube structure is provided with a first or through passage 62a for a free-flowing body of urine, on which floats a hydrometer $h1$ comparing in all respects to the previously described hydrometer $h$, and, through the provision of a cross partition 64, with a closed-bottom collection chamber 62b for maintaining in said leg a quiescent pool of the urine collecting therein, on which a second hydrometer $h2$ floats. This arrangement provides both for the hydrometer $h1$ giving a reading of the specific gravity of the urine substantially as it is produced and for the hydrometer $h2$ giving a reading of the specific gravity of a pooled specimen of the urine collecting in said chamber 62b. Any significant variation between these two readings can visually indicate a rapid change in the clinical condition obtaining in the patient, and thus the modified urinary specific gravity measuring device according to FIG. 4 may be usefully employed in circumstances wherein any such variation is considered to be of importance clinically.

Without further analysis, it will be appreciated that a diagnostic appliance as described and illustrated combines the functions of a retention urethral catheter and a specific gravity measuring and indicating device in highly useful manner. That is to say, an appliance of the invention enables a profile study of the specific gravity of a patient's urine to be made practically as it is being produced, thus yielding valuable clinical information as to the patient's plasma fluid and electrolyte conditions and/or requirements. An outstanding feature of my appliance is that by providing for free flow of the urine being produced, it avoids the dangerous effect of back pressure on the urinary bladder and kidney, while at the same time insuring that only the most recently produced urine is utilized for testing purposes.

Ancillary advantages of my combined catheter and urinary specific gravity determining appliance are that in addition to performing its primary function as described, it may also be usefully employed in providing free-flowing sterile urine for laboratory testing and analysis and in providing differential readings for comparison purposes of the specific gravity and/or density of the most recently produced urine and of "-pooled specimens" thereof.

As many changes could be made in carrying out the above constructions it is intended that all matter contained in the above description or shown in the accompanying drawing shall be interpreted as illustrative and not in a limiting sense.

I claim:

1. An appliance for determining at any given time the specific gravity of urine as it drains from an indwelling retention catheter comprising, in combination: an indwelling retention catheter including a urine drainage tube; a urine drain line extending between the proximal end of said drainage tube and a collection receptacle; said drain line incorporating as a length portion thereof a tube structure consisting of three vertically disposed legs connected in series relation and in fluid communication by U-bends, the second leg of the series thereof having less height than said first leg as insures a constant-level column of urine forming in said first leg for testing purposes; said first leg having a cross partition which divides its interior space into first and second test chambers, of which the first test chamber is in full-open fluid communication with said urine drainage tube from the catheter and said shorter leg of the tube structure whereby urine draining to same will collect in said first test chamber but as a free-flowing column, and said second test chamber while also in full-open fluid communication with said urine drainage tube is normally devoid of any communication with said second shorter leg whereby urine entering said second test column collects therein as a quiescent pool; a first hydrometer disposed in said first test chamber and floating on the urine of the free-flowing column thereof; and a second hydrometer in said second test chamber and floating on the urine of the quiescent pool thereof.